United States Patent
Elkins et al.

(10) Patent No.: US 9,488,723 B2
(45) Date of Patent: Nov. 8, 2016

(54) METHOD AND SYSTEM OF CONTROLLING A DRIVE-THRU OPERATION OF A QUICK-SERVICE RESTAURANT

(71) Applicant: Universal Atlantic Systems, Inc., Broomall, PA (US)

(72) Inventors: Scott R. Elkins, Broomall, PA (US); Stuart Bercun, Broomall, PA (US)

(73) Assignee: Universal Atlantic Systems, Inc., Paoli, PA (US)

( * ) Notice: Subject to any disclaimer, the term of this patent is extended or adjusted under 35 U.S.C. 154(b) by 264 days.

(21) Appl. No.: 14/279,419

(22) Filed: May 16, 2014

(65) Prior Publication Data

US 2015/0331094 A1    Nov. 19, 2015

(51) Int. Cl.
| | |
|---|---|
| *G01S 11/14* | (2006.01) |
| *G06Q 10/04* | (2012.01) |
| *G06Q 10/06* | (2012.01) |
| G06Q 50/12 | (2012.01) |
| G01S 15/04 | (2006.01) |

(52) U.S. Cl.
CPC ............. *G01S 11/14* (2013.01); *G06Q 10/04* (2013.01); *G06Q 10/063* (2013.01); *G01S 15/04* (2013.01); *G06Q 50/12* (2013.01)

(58) Field of Classification Search
CPC ....... G01S 11/14; G01S 15/04; G06Q 50/12; G06Q 10/00; G06Q 10/063; G08B 5/00
USPC ............... 367/118, 96; 340/286.09
See application file for complete search history.

(56) References Cited

U.S. PATENT DOCUMENTS

| | | | | |
|---|---|---|---|---|
| 5,079,751 | A * | 1/1992 | Woodward | G01S 7/003 367/96 |
| 6,239,736 | B1 * | 5/2001 | McDonald | G01S 7/2922 340/554 |
| 9,251,482 | B2 * | 2/2016 | Kwak | G06Q 10/06398 |
| 2004/0260513 | A1 * | 12/2004 | Fitzpatrick | G06Q 10/06 702/182 |

OTHER PUBLICATIONS

"Fast Track 2+2 User Guide," Phase Research, 2011, 144 pp.*

* cited by examiner

*Primary Examiner* — Daniel L Murphy
(74) *Attorney, Agent, or Firm* — Morgan Lewis & Bockius LLP

(57) ABSTRACT

A method of controlling a drive-thru operation of a quick-service restaurant (QSR) includes detecting using a range finding device, when a vehicle enters a drive-thru proximity zone of the QSR; measuring a plurality of range data of the vehicle entering the drive-thru proximity zone; transmitting simultaneously the plurality of range data to a controller device; calculating at the controller device, a dwell time of the vehicle based on the plurality of range data; determining at the controller device, whether the dwell time of the vehicle exceeds a pre-set dwell time threshold; transmitting the dwell time of the vehicle to a cloud server when a violation occurs; and instructing a central station from the cloud server to send a notification message to the QSR when the dwell time of the vehicle exceeds the pre-set threshold.

19 Claims, 6 Drawing Sheets

METHOD AND SYSTEM OF CONTROLLING A DRIVE-THRU OPERATION OF A QUICK-SERVICE RESTAURANT

FIELD OF THE INVENTION

The present invention relates to the field of a quick-service restaurant (QSR) operation, in particular, relates to a method and system of controlling a drive-thru operation of a quick-service restaurant.

BACKGROUND OF THE INVENTION

A quick-service restaurant provides customers both indoor table service and outdoor drive-thru service. Although a seating area is provided, the quick-service restaurant menu is designed to be ready to be taken away. In addition to taking orders at a front counter inside or outside the restaurant, the drive-thru service can allow customers to order and pick up food from their vehicles. According to a 2012 quick-service restaurant study, the drive-thru service at a quick-service restaurant can account for anywhere between 50 and 70 percent of sales—no small number in a $200 billion industry.

In recent years, unfortunately, the drive-thru operation of a quick-service restaurant appears relatively reduced, and the quick-service restaurant is losing revenue on the drive-thru service due to excessive "dwell time." In the field of a quick-service restaurant, dwell time is defined as the elapsed time a vehicle remains stationary in the drive-thru lane. Customers of the quick-service restaurant demand fast service. If customers have to wait too long to order, i.e., the dwell time is lengthy, they may drive off and visit a competitor's location. If the drive-thru service of a quick-service restaurant is consistently slow, customers may reject this restaurant in the future.

Technologies have been employed to improve the drive-thru operation of a quick-service restaurant. For example, a hospitality point of sale system is introduced such that kitchen crew people can view orders placed at the front counter or the drive-thru order window in real time. Further, wireless systems implemented in the quick-service restaurant allow orders placed at the drive-thru speakers to be taken by cashiers and cooks. However, to solve the drive off problem of the customers, restaurant personnel currently have to rely on the onsite manager, his/her observation, or hours of motion searches to know when and how often drive offs occur, all of which are very inefficient and inaccurate. There is a need of a system that can provide the quick-service restaurant real time support to solve the drive off problem and improve the drive-thru service. The present invention introduces a method and system to calculate the dwell time of the vehicles entering the drive-thru lane, and provide the quick-service restaurant real time monitoring and instant alert of excessive dwell time.

SUMMARY

In accordance with some embodiments, a method of controlling a drive-thru operation of a quick-service restaurant (QSR) comprises detection using a range finding device, when a vehicle enters a drive-thru proximity zone of the QSR; measuring a plurality of range data of the vehicle entering the drive-thru proximity zone; transmitting simultaneously the plurality of range data to a controller device; calculating at the controller device, a dwell time of the vehicle based on the plurality of range data; determining at the controller, whether the dwell time of the vehicle exceeds a pre-set dwell time threshold; signaling the cloud server of beyond tolerance events and issuing alerts via a variety of modalities (i.e., text message, email, Central Station voice calls) from the cloud server to send a notification message to the QSR when the dwell time of the vehicle exceeds the pre-set threshold.

In accordance with some embodiments, the method of controlling the drive-thru operation of a quick-service restaurant (QSR) further comprises retrieving at the controller device, an entry time when the vehicle enters the drive-thru proximity zone and an exit time when the vehicle exits the drive-thru proximity zone; and calculating a differential value of the entry time and the exit time as the dwell time of the vehicle.

In accordance with some embodiments, the method of controlling the drive-thru operation of a quick-service restaurant (QSR) further comprises calibrating the plurality of range data before transmitting to the controller device.

In accordance with some embodiments, the method of controlling the drive-thru operation of a quick-service restaurant (QSR) further comprises storing at the cloud server, the entry time, exit time and the dwell time of the vehicle only when the dwell time has exceeded the preset tolerance, i.e., the pre-set dwell time threshold.

In accordance with some embodiments, the drive-thru proximity zone is a cone shaped area extending from the range finding device through the area of interrogation. The area of interrogation is the point defined by the end user where there is a perceived risk that subsequent customers will chose not to wait in line.

In accordance with some embodiments, the plurality of range data is measured at a frequency configured in the range finding device.

In accordance with some embodiments, the notification message comprises a short message service (SMS) text message, an email, or a voice call.

In accordance with some embodiments, the notification message is simultaneously sent to a plurality of pre-selected personnel of the QSR.

In accordance with some embodiments, the pre-set dwell time threshold is configured to be editable by the QSR.

In accordance with some embodiments, a system of controlling the drive-thru operation of a quick-service restaurant (QSR) comprises a range finding device configured to detect when a vehicle enters a drive-thru proximity zone of the quick-service restaurant to measure a plurality of range data of the vehicle entering the drive-thru proximity zone; a controller device connected to the range finding device, and configured to receive simultaneously the plurality of range data from the range finding device, calculate a dwell time of the vehicle based on the plurality of range data, and determine whether the dwell time of the vehicle exceeds a pre-set dwell time threshold; a cloud server configured to receive the each entry, each exit and the dwell time only when the dwell time exceeds the preset tolerance of the vehicle, i.e., the pre-set dwell time threshold from the controller device via internet; and a central station configured to receive instructions from the cloud server, and send a notification message to the QSR when the dwell time of the vehicle exceeds the pre-set threshold.

In accordance with some embodiments, the controller device is further configured to retrieve an entry time when the vehicle enters the drive-thru proximity zone and an exit time when the vehicle exits the drive-thru proximity zone, and calculate a differential value of the entry time and the exit time as the dwell time of the vehicle.

In accordance with some embodiments, the cloud server is further configured to store each entry, each exit and the dwell time of the vehicle only when the dwell time has exceeded the preset tolerance, i.e., the pre-set dwell time threshold.

In accordance with some embodiments, the system of controlling the drive-thru operation of a quick-service restaurant (QSR) further comprises an external router configured to connect to the internet; and an internal router configured to connect the controller device and the external router.

In accordance with some embodiments, the range finding device is configured to measure the plurality of range data of the vehicle using at least an ultrasonic sensor.

In accordance with some embodiments, the controller device is configured with one or more processors and memory for storing applications to be executed by the one or more processors, wherein the applications are programmed to calculate the dwell time of the vehicle based on the plurality of range data.

In accordance with some embodiments, the range finding device further comprises a sensing unit configured to read the plurality of range data of the vehicle entering the drive-thru proximity zone; a proximity set-up unit configured to set up the drive-thru proximity zone; and a frequency set-up unit configured to set up a frequency that the plurality of range data is measured, wherein the drive-thru proximity zone is a cone shaped area extending from the range finding device through the area of interrogation. The area of interrogation is the point defined by the end user where there is a perceived risk that subsequent customers will chose not to wait in line.

In accordance with some embodiments, the range finding device further comprises a calibration unit configured to calibrate the plurality of range data before transmitting to the controller device.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of system to manage a drive-thru operation of a quick-service restaurant.

Figure 1:
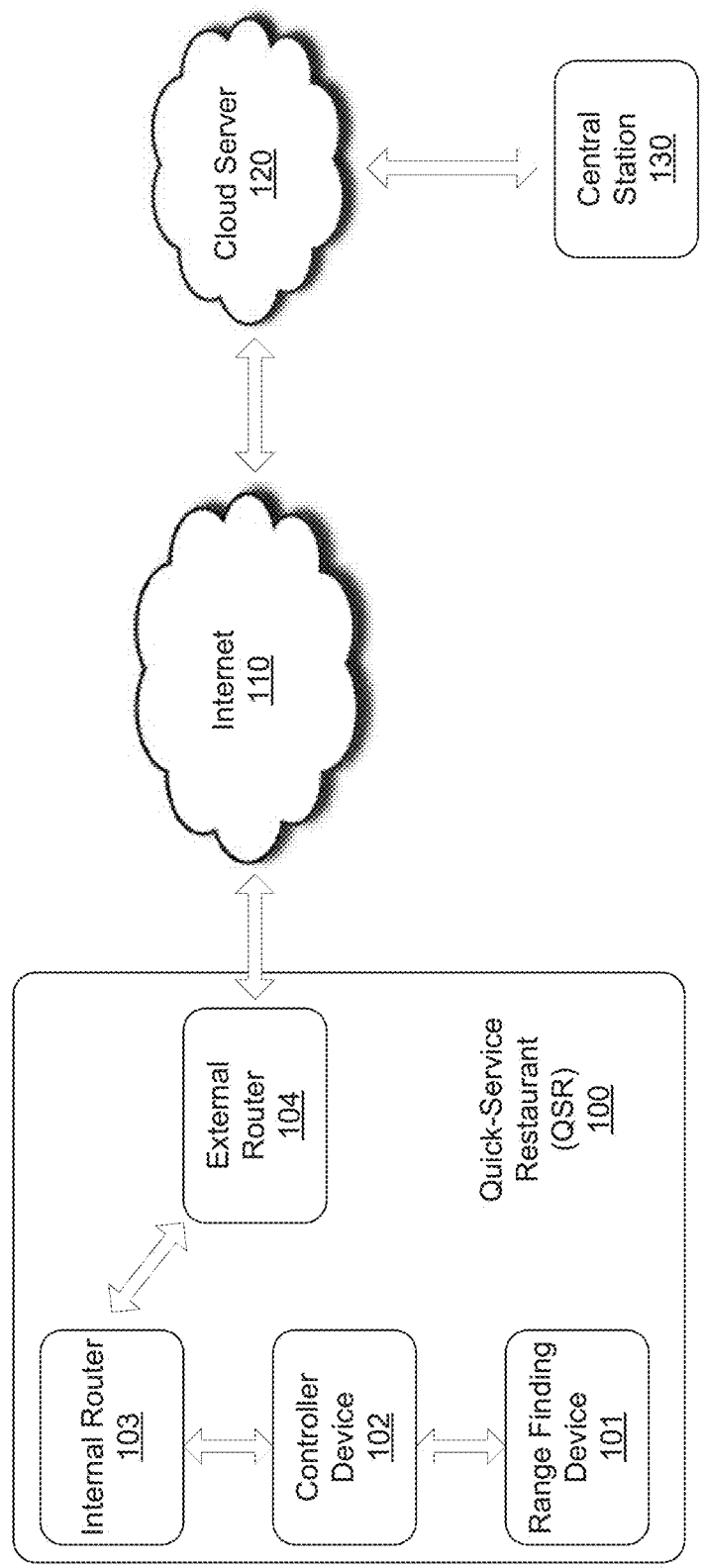
FIG. 1 illustrates an exemplary embodiment of a system of controlling the drive-thru operation of a quick-service restaurant (QSR) in accordance with the present invention.

FIG. 1 illustrates an exemplary embodiment of a system of controlling the drive-thru operation of a quick-service restaurant (QSR) in accordance with the present invention. The system comprises a range finding device 101, a controller device 102, an internal router 103, and an external router 104 implemented in a quick-service restaurant 100; internet 110; a cloud server 120; and a central station 130.

The range finding device 101 is configured to detect when a vehicle enters a drive-thru proximity zone of the quick-service restaurant, and measure a plurality of range data of the vehicle entering the drive-thru proximity zone. In accordance with some embodiments, the range finding device 101 may comprise one or more ultrasonic sensors to provide certain distance detection and ranging in a compact and robust PVC housing. As the range finding device 101 may be mounted on the exterior wall of the quick-service restaurant facing the drive-thru lane, the ultrasonic sensor has to meet certain weather resistant standards, for example, water intrusion standard and PVC pipe fitting standard etc. A high performance ultrasonic range finders HRXL-Max-Sonar-WR may be implemented in accordance with some embodiments.

The controller device 102 is connected to the range finding device 101, and is configured to receive simultaneously the plurality of range data from the range finding device and calculate a dwell time of the vehicle entering the drive-thru proximity zone based on the plurality of range data. In accordance with some embodiments, after receiving the plurality of range data, the controller device 102 retrieves an entry time when the vehicle enters the drive-thru proximity zone and an exit time when the vehicle exits the drive-thru proximity zone, and calculates a differential value of the entry time and the exit time as the dwell time of the vehicles. The controller device 102 further determines whether the dwell time of the vehicle exceeds a pre-set threshold, and transmits the entry time, exit time and the dwell time of the vehicle when such dwell time exceeds the tolerance, i.e., the pre-set dwell time threshold specified by the user (i.e., a QSR manager) to the cloud server 120 via the internal router 103, the external router 104, and internet 110. The interface between the external router 104 and internet 110 and the interface between internet 110 and the cloud server 120 meet standard TCP/IP and/or UDP protocol(s). The interface between the controller device 102 and the internal router 103 and the interface between the internal router 103 and the external router 104 may be any of the user-defined protocols.

The cloud server 120 is configured to receive the dwell time of the vehicle from the controller device 102, and is signaled of a beyond tolerance event when the dwell time of the vehicle exceeds the pre-set threshold. The cloud server 120 further issues alerts via a variety of modalities (i.e., a text message 702, an email 703, or a central station voice call from the central station 130, etc.) to the QSR. The quick-service restaurant personnel are then notified that a lengthy dwell time occurs and the restaurant may need to speed up the service. The dwell time of the vehicle and the pre-set dwell time threshold are stored in the cloud server 120.

As each quick-service restaurant may have individual operation modes based on various factors such as food/drink menu, location of the restaurant, service time, numbers of personnel working in the restaurant etc., the pre-set dwell time threshold may be configured to be editable by the individual quick-service restaurant to conform with individual operation needs. For example, if a high dwell time threshold is set during busy lunch time, customers may have to wait in the drive-thru lane too long to order and may drive off to visit a nearby competitor's location. On the contrary, if the dwell time threshold is set too low, frequent alert of a lengthy dwell time may unnecessarily interfere with the normal operation of the restaurant. Accordingly, the present invention provides each individual quick-service restaurant the flexibility to set and adjust the dwell time threshold so as to improve the drive-thru service.

In accordance with some embodiments, a notification message that the dwell time exceeds the pre-set threshold is simultaneously sent to a plurality of pre-selected personnel of the quick-service restaurant. Personnel of the restaurant working at different schedules may receive the notification message when they are on duty. A restaurant manager may choose to receive the notification message at all times. Further, multiple personnel on duty receiving the notification message at the same time ensures that the restaurant receives the alert of slow service in the drive-thru lane. By pre-selecting lists of restaurant personnel to receive the notification message based on their working schedule and configuring the lists of restaurant personnel in the cloud server 120, the quick-service restaurant can respond quickly to a lengthy dwell time alert and speed up the drive-thru service.

In accordance with some embodiments, the range finding device 101 measures the range data of a third (may or may not be the third vehicle) vehicle when there are three or more vehicles enter the drive-thru proximity zone, and the dwell time of the third vehicle is used to evaluate the drive-thru service of the quick-service restaurant.

Figure 2:
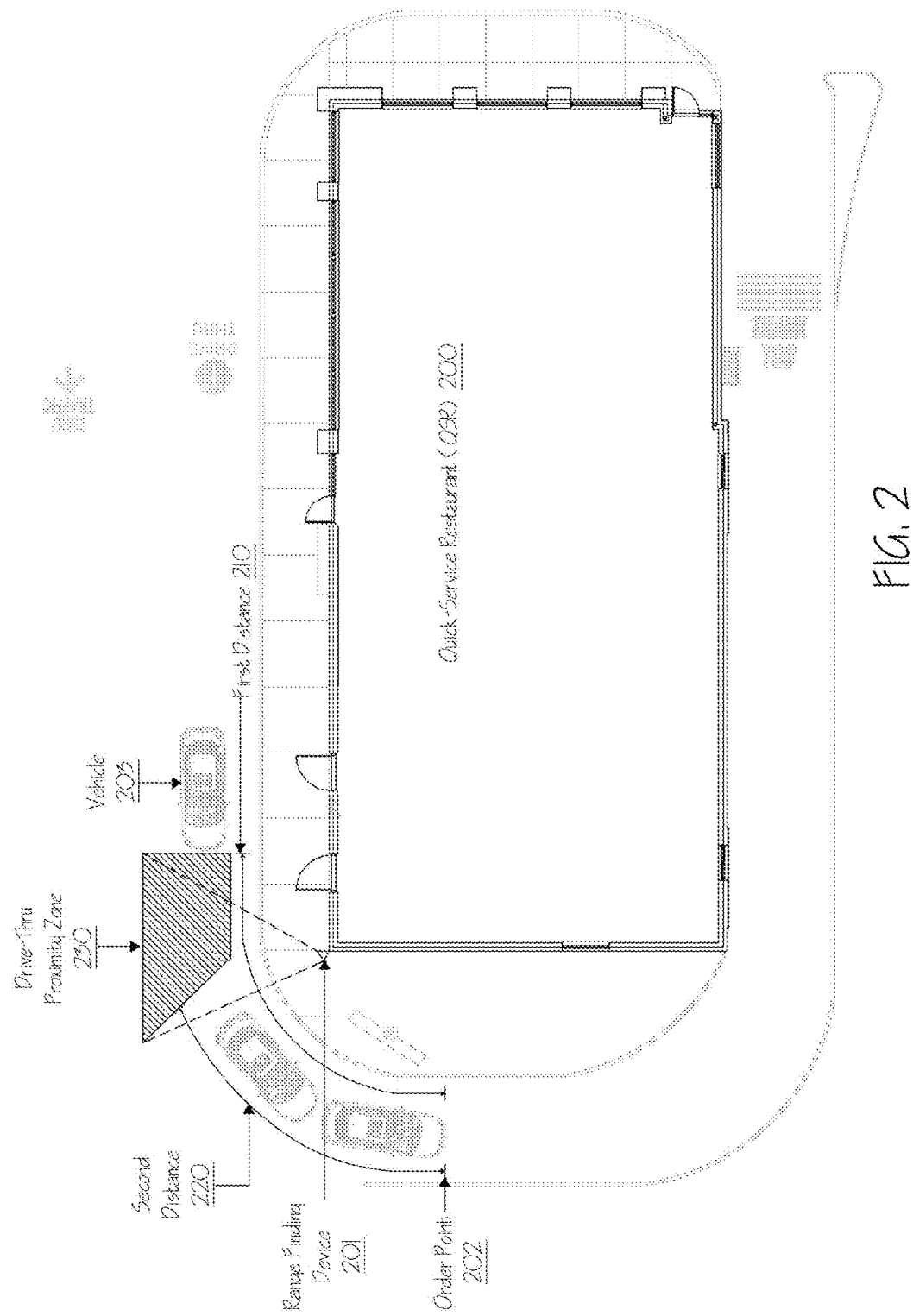
FIG. 2 illustrates an exemplary embodiment of an exterior configuration of the system of controlling the drive-thru operation of a quick-service restaurant (QSR) in accordance with the present invention.

FIG. 2 illustrates an exemplary embodiment of an exterior configuration of the system of controlling the drive-thru operation of a quick-service restaurant (QSR) in accordance with the present invention. As shown in FIG. 2, a range finding device 201 is mounted on the exterior wall of the quick service restaurant 200 facing the drive-thru lane of the restaurant. When vehicle 203 enters the drive-thru lane and approaches an order point 202 of the restaurant, the range finding device 201 continuously measures the range data of the vehicle 203 in a drive-thru proximity zone 230. In accordance with some embodiments, the drive-thru proximity zone 230 starts at a first distance 210 from the order point 202, and ends at a second distance 220 from the order point 202. The first distance 210 and the second distance 220 may be configured in a controller device of the QSR to meet the operation needs of each individual quick-service restaurant.

Figure 3:
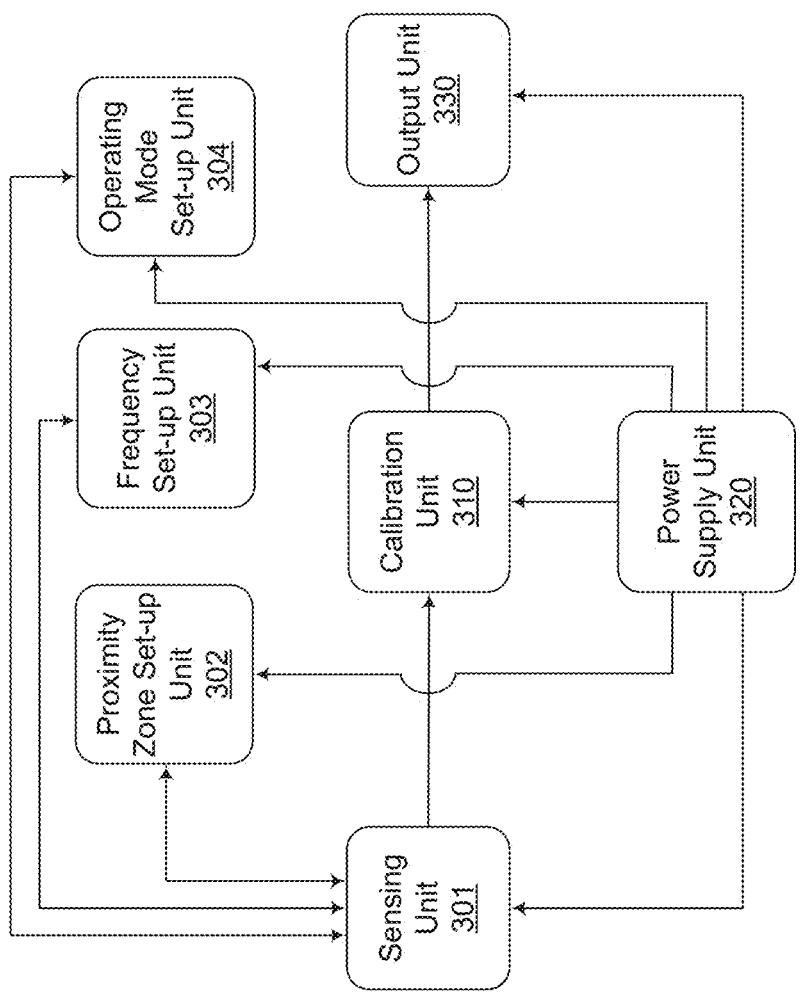
FIG. 3 illustrates an exemplary embodiment of a range finding device in accordance with the present invention.

FIG. 3 illustrates an exemplary embodiment of a range finding device in accordance with the present invention. The range finding device in accordance with the exemplary embodiment comprises a sensing unit 301 configured to read a plurality of range data of a vehicle entering the drive-thru proximity zone; a proximity set-up unit 302 configured to set up the drive-thru proximity zone; a frequency set-up unit 303 configured to set up a frequency that the plurality of range data is measured; a calibration unit 310 configured to calibrate the plurality of range data before transmitting to the controller device; a power supply unit 320 configured to supply power to the various function units; an operation mode set-up unit 304 configured to set the sensing operation mode; and an output unit 330 configured to output the plurality of range data of the vehicle. The sensing unit 301 may be configured to detect a target, i.e., a vehicle, from 30 centimeters to a maximum range from an order point of the quick-service restaurant. Based on the models of the range finding device, the maximum range may be 4999 millimeters (5 meter model) or 9998 millimeters (10 meter model). A range data value of 5000 or 9999 or a preset value equivalent to the maximum distance of desired interrogation corresponds to no target being detected in the drive-thru proximity zone.

In accordance with some embodiments, the sensing unit 301 may be configured to measure the range data at a frequency of four times every second.

In accordance with some embodiments, the calibration unit 310 may auto-calibrate the range reading of the sensing unit 301 because the range finding device in the present invention operates as an in-air, non-contact target detection and ranging sensor, environment factors such as temperature and humidity may affect the accuracy of the range data. Further, the voltage supplied to the range finding device may affect the reading of the range data. The calibration unit 310 may apply compensation for changes caused by temperature, humidity, and voltage supply.

In accordance with some embodiments, the output unit 330 of the range finding device may output the range data in a serial mode.

Figure 4:
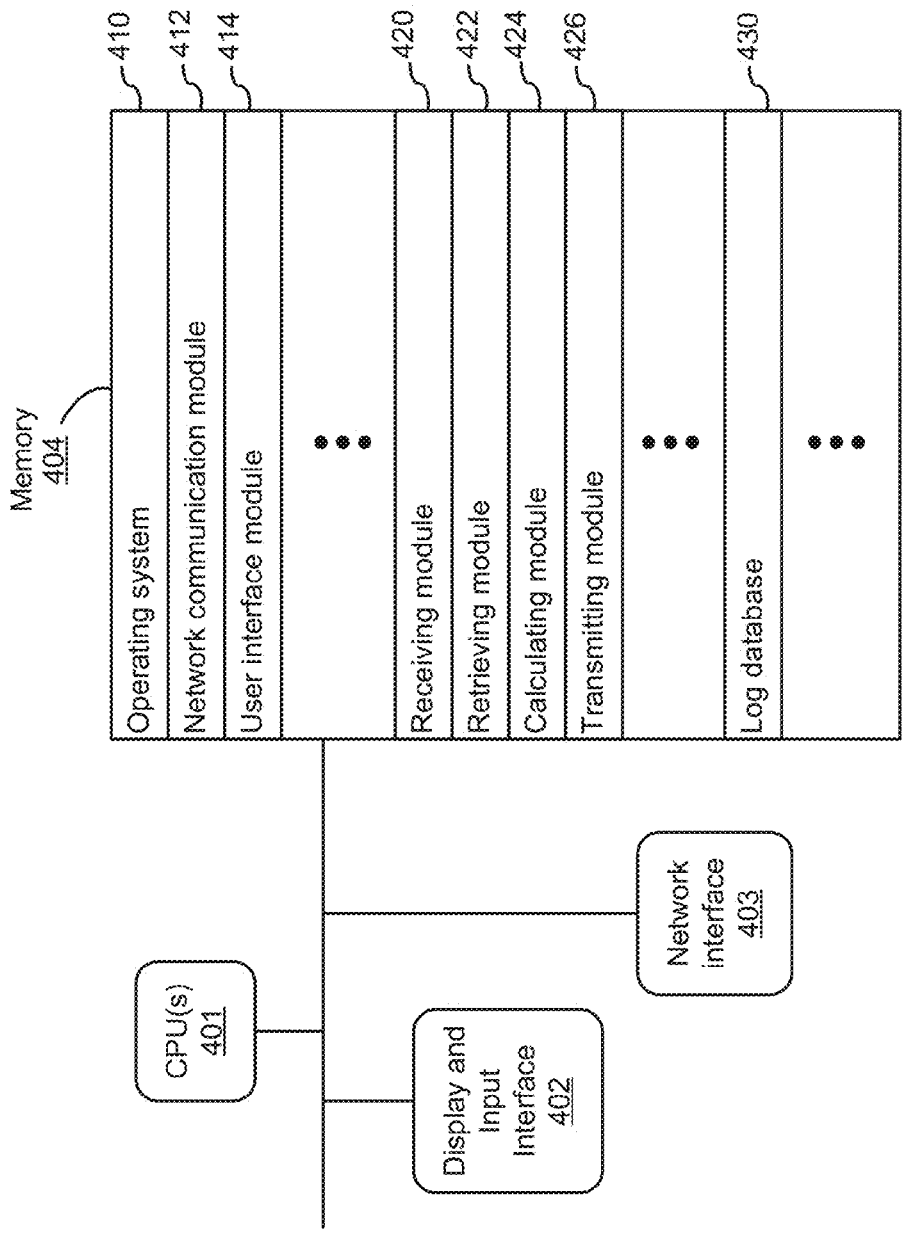
FIG. 4 illustrates an exemplary embodiment of a controller device in accordance with the present invention.

FIG. 4 illustrates an exemplary embodiment of a controller device in accordance with the present invention. The controller device in accordance with the exemplary embodiment comprises one or more processors CPU(s) 401; a display and input interface 402; a network interface 403; a memory 404; an operating system 410; a network communication module 412; a user interface module 414; a receiving module 420 configured to receive a plurality of range data from the range finding device; a retrieving module 422 configured to retrieve an entry time when the vehicle enters the drive-thru proximity zone and an exit time when the vehicle exists the drive-thru proximity zone; a calculating module 424 configured to calculate the dwell time of the vehicle entering the drive-thru proximity zone; a transmitting module 426 configured to transmit the dwell time to a cloud server; and a log database configured to log the processing data for each received range data.

Figure 5:
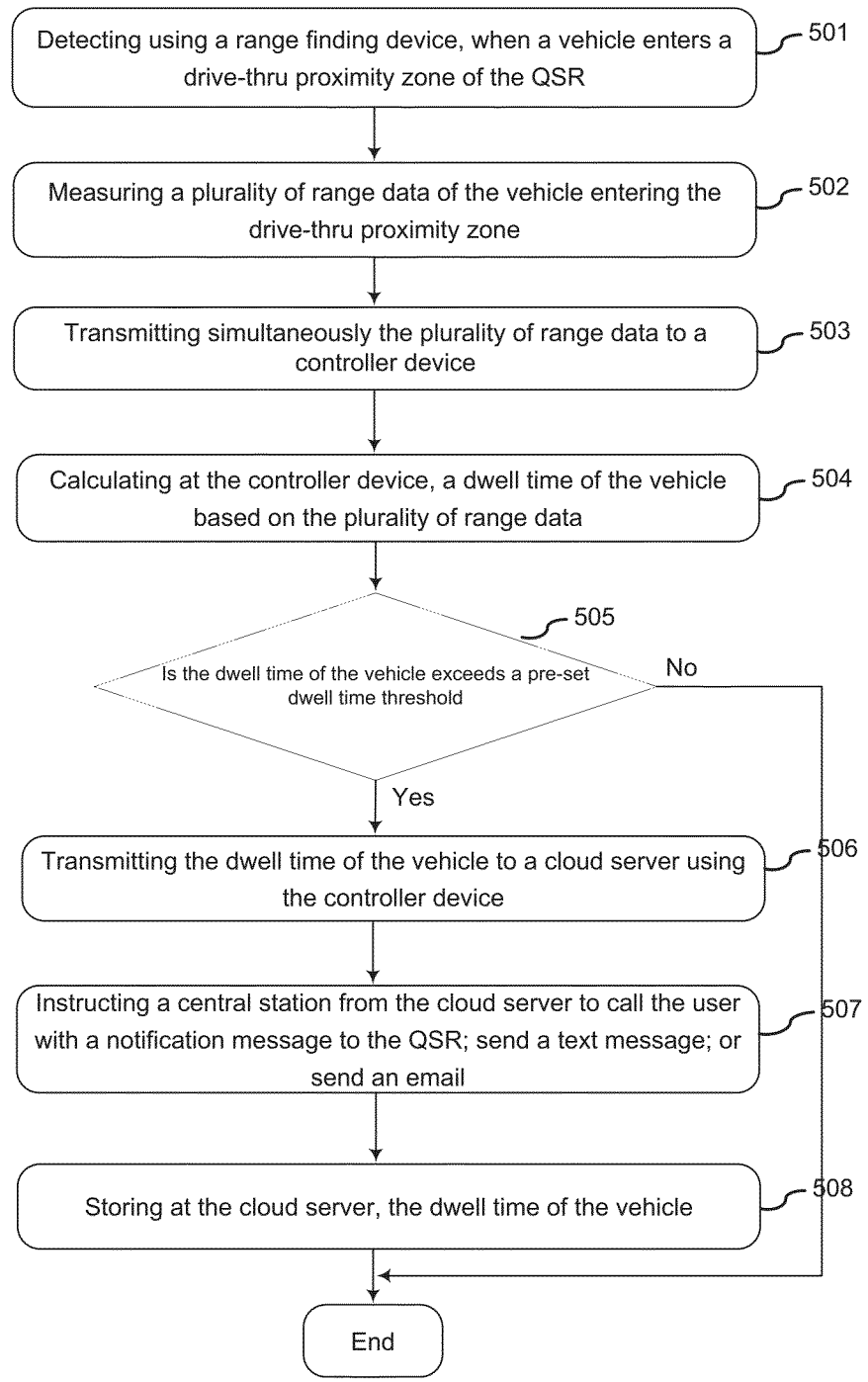
FIG. 5 illustrates an exemplary flowchart diagram of a method of controlling the drive-thru operation of a quick-service restaurant (QSR) in accordance with the present invention.

FIG. 5 illustrates an exemplary flowchart diagram of a method of controlling the drive-thru operation of a quick-service restaurant (QSR) in accordance with the present invention. The method of controlling the drive-thru operation of a quick-service restaurant (QSR) comprises detecting at a range device, when a vehicle enters a drive-thru proximity zone of the quick-service restaurant 501; measuring a plurality of range data of the vehicle entering the drive-thru proximity zone 502; transmitting simultaneously the plurality of range data to a controller device 503; calculating at the controller device, a dwell time of the vehicle based on the plurality of range data 504; determining whether the dwell time of the vehicle exceeds the pre-set dwell time threshold 505; if the dwell time of the vehicle exceeds the pre-set threshold, transmitting the dwell time of the vehicle to a cloud server using the controller device if the dwell time of the vehicle exceeds the pre-set threshold 506; instructing a central station from the cloud server to call the user (i.e., a QSR manager) with a message to the QSR personnel, send a text message, or send an email 507; and storing at the cloud server, the entry time, exit time, and the dwell time of the vehicle when the dwell time of event is beyond the preset tolerance, i.e., the dwell time of the vehicle has exceeded the pre-set threshold 508.

Figure 6:
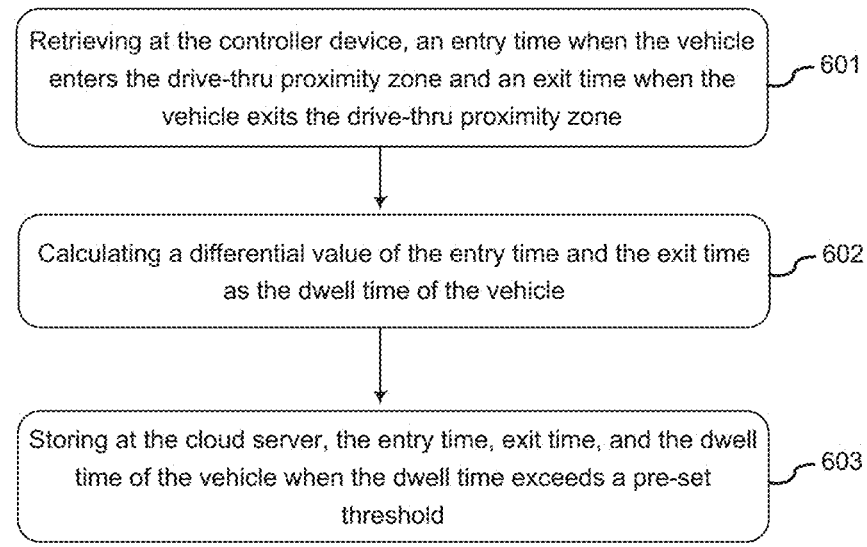
FIG. 6 illustrates another exemplary flowchart diagram of a method of controlling the drive-thru operation of a quick-service restaurant (QSR) in accordance with the present invention.

FIG. 6 illustrates another exemplary flowchart diagram of a method of controlling the drive-thru operation of a quick-service restaurant (QSR) in accordance with the present invention. The method of controlling the drive-thru operation of a quick-service restaurant (QSR) further comprises retrieving at the controller device, an entry time when the vehicle enters the drive-thru proximity zone and an exit time when the vehicle exits the drive-thru proximity zone 601, calculating a differential value of the entry time and the exit time as the dwell time of the vehicle 602, and storing at the cloud server, the entry time, exit time, and the dwell time of the vehicle when the dwell time exceeds a pre-set threshold 603.

Figure 7:
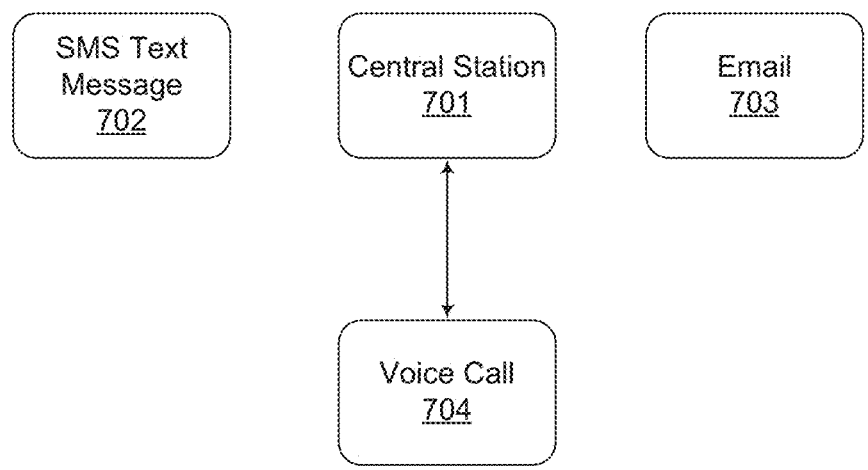
FIG. 7 illustrates an exemplary embodiment of transmitting a notification message to a quick-service restaurant (QSR) in accordance with the present invention.

FIG. 7 illustrates an exemplary embodiment of transmitting a notification message to a quick-service restaurant (QSR) in accordance with the present invention. In accordance with the exemplary embodiment, the central station 701 may transmit the notification message to the quick-service restaurant via a short message service (SMS) text message 702; an email 703; or a voice call 704 from the central station personnel. The central station 701 may also push the notification message to other media terminal implemented in the quick-service restaurant and visible to the restaurant personnel.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A method of controlling a drive-thru operation of a quick-service restaurant (QSR) comprising:
    detecting using an ultrasonic sensor, when a vehicle enters a drive-thru proximity zone of the QSR and sending a first visible alert upon detection;
    measuring a plurality of range data of the vehicle entering the drive-thru proximity zone;
    transmitting, in real time, simultaneously the plurality of range data to a controller device;
    calculating, in real time, at the controller device, a dwell time of the vehicle based on the plurality of range data;
    determining at the controller device, in real time, whether the dwell time of the vehicle exceeds a pre-set dwell time threshold, and if the pre-set dwell time is exceeded, sending a second visible alert;
    transmitting, in real time, the dwell time of the vehicle to a cloud server via internet when the dwell time of the vehicle exceeds a pre-set dwell time threshold; and
    instructing, in real time, a central station from the cloud server to send an immediate notification message to the QSR when the dwell time of the vehicle exceeds the pre-set threshold.

2. The method of controlling the drive-thru operation of a quick-service restaurant (QSR) according to claim 1, further comprising:
    retrieving at the controller device, an entry time when the vehicle enters the drive-thru proximity zone and an exit time when the vehicle exits the drive-thru proximity zone; and
    calculating a differential value of the entry time and the exit time as the dwell time of the vehicle.

3. The method of controlling the drive-thru operation of a quick-service restaurant (QSR) according to claim 1, further comprising:
    calibrating the plurality of range data before transmitting to the controller device.

4. The method of controlling the drive-thru operation of a quick-service restaurant (QSR) according to claim 2, further comprising:
    storing at the cloud server, the entry time, exit time and the dwell time of the vehicle when the dwell time of the vehicle exceeds the pre-set dwell time threshold.

5. The method of controlling the drive-thru operation of a quick-service restaurant (QSR) according to claim 1, wherein
    the drive-thru proximity zone starts at a first distance from an order point of the QSR, and ends at a second distance from the order point, wherein the first distance and the second distance are configured in the controller device.

6. The method of controlling the drive-thru operation of a quick-service restaurant (QSR) according to claim 1, wherein
    the plurality of range data is measured at a frequency configured in the ultrasonic sensor.

7. The method of controlling the drive-thru operation of a quick-service restaurant (QSR) according to claim 1, wherein
    the notification message comprises a short message service (SMS) text message, an email, or a voice call from central station personnel.

8. The method of controlling the drive-thru operation of a quick-service restaurant (QSR) according to claim 1, wherein
    the notification message is simultaneously sent to a plurality of pre-selected personnel of the QSR.

9. The method of controlling the drive-thru operation of a quick-service restaurant (QSR) according to claim 1, wherein
    the pre-set dwell time threshold is configured to be editable by the QSR.

10. A system of controlling the drive-thru operation of a quick-service restaurant (QSR) comprising:
    an ultrasonic sensor configured to detect when a vehicle enters a drive-thru proximity zone of the quick-service restaurant to measure a plurality of range data of the vehicle entering the drive-thru proximity zone;
    a controller device connected to the ultrasonic sensor, and configured to receive simultaneously the plurality of range data from the ultrasonic sensor, calculate a dwell time of the vehicle based on the plurality of range data, and determine whether the dwell time of the vehicle exceeds a pre-set dwell time threshold in real time;
    a cloud server configured to receive the dwell time of the vehicle from the controller device via internet when the dwell time of the vehicle exceeds a pre-set dwell time threshold; and
    a central station configured to receive instructions from the cloud server, and send a notification message to the QSR when the dwell time of the vehicle exceeds the pre-set threshold in real time.

11. The system of controlling the drive-thru operation of a quick-service restaurant (QSR) according to claim 10, wherein
the controller device is further configured to retrieve an entry time when the vehicle enters the drive-thru proximity zone and an exit time when the vehicle exits the drive-thru proximity zone, and calculate a differential value of the entry time and the exit time as the dwell time of the vehicle.

12. The system of controlling the drive-thru operation of a quick-service restaurant (QSR) according to claim 11, wherein
the cloud server is further configured to store the entry time, exit time and the dwell time of the vehicle when the dwell time of the vehicle exceeds the pre-set dwell time threshold.

13. The system of controlling the drive-thru operation of a quick-service restaurant (QSR) according to claim 10 further comprising:
an external router configured to connect to the internet; and
an internal router configured to connect the controller device and the external router.

14. The system of controlling the drive-thru operation of a quick-service restaurant (QSR) according to claim 10, wherein
the controller device is configured with one or more processors and memory for storing applications to be executed by the one or more processors, wherein the applications are programmed to calculate the dwell time of the vehicle based on the plurality of range data.

15. The system of controlling the drive-thru operation of a quick-service restaurant (QSR) according to claim 10, wherein the ultrasonic sensor further comprises:
a sensing unit configured to read the plurality of range data of the vehicle entering the drive-thru proximity zone;
a proximity set-up unit configured to set up the drive-thru proximity zone; and
a frequency set-up unit configured to set up a frequency that the plurality of range data is measured,
wherein the drive-thru proximity zone starts at a first distance from an order point of the QSR, and ends at a second distance from the order point, wherein the first distance and the second distance are configured in the controller device.

16. The system of controlling the drive-thru operation of a quick-service restaurant (QSR) according to claim 10, wherein the ultrasonic sensor further comprises:
a calibration unit configured to calibrate the plurality of range data before transmitting to the controller device.

17. The system of controlling the drive-thru operation of a quick-service restaurant (QSR) according to claim 10, wherein
the notification message comprises a short message service (SMS) text message, an email, or a voice call from central station personnel.

18. The system of controlling the drive-thru operation of a quick-service restaurant (QSR) according to claim 10, wherein
the notification message is simultaneously sent to a plurality of pre-selected personnel of the QSR.

19. The system of controlling the drive-thru operation of a quick-service restaurant (QSR) according to claim 10, wherein
the pre-set dwell time threshold is configured to be editable by the QSR.

* * * * *